G. G. HENRY.
MAKING OIL, OIL CAKE, AND MANURE FROM COTTON SEED.
No. 26,845.  Patented Jan. 17, 1860.
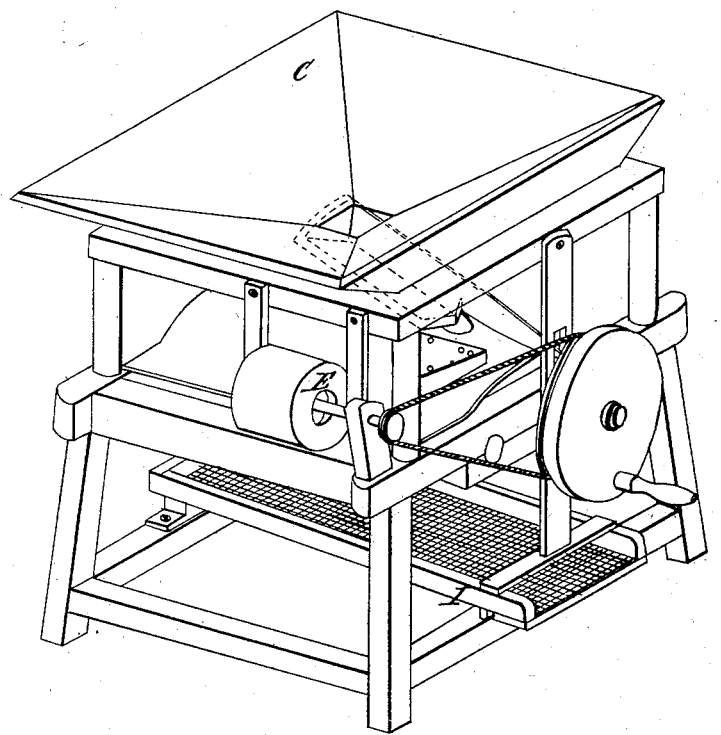

UNITED STATES PATENT OFFICE.

GEORGE G. HENRY, OF MOBILE, ALABAMA.

MANUFACTURE OF OIL FROM COTTON-SEED.

Specification of Letters Patent No. 26,845, dated January 17, 1860.

*To all whom it may concern:*

Be it known that I, GEORGE G. HENRY, of the city and county of Mobile, in the State of Alabama, have invented or discovered a new and useful Process for Making Oil, Oil-Cake, and Manure from Cotton-Seed, of which the following is a full, clear, and exact description, reference being had to the accompanying drawing, which makes part of this specification, and which represents a mill which I have discovered to be peculiarly applicable to one part of my said process.

In order to present clearly the character and extent of my invention, it will be necessary for me to describe somewhat at length the nature of cotton seed; the use that is made of it, and the results of such use. The bulk and weight of cotton seed taken from a crop is very great; the weight of the seed, for example, being about two and a half times greater than that of the lint cotton, from which it is separated; while the seed only weighs about thirty pounds to the bushel. As the cotton is ginned or spun the seed accumulate with such rapidity that their removal, necessary as it is, requires a great deal of labor. The uses to which these seed might be applied have heretofore been very limited, and their value, consequently, very trifling. Some portions of them are burned with the wood in the steam engine; some planters use a portion of them for manure, while those planting on thin lands make extensive use of them. A few planters sell small parcels of them, but at a price which scarcely pays for sacking and delivering. Some cause them to undergo a boiling or fermenting process, and feed them to their hogs and cattle. Some portions are hauled off, bulked up, and allowed to rot; but it is very often the case that owing to the great inconvenience and labor of removing the seed a quantity is allowed to remain around the gin-house and rot, in either case becoming a decided nuisance, and the exciting cause of much illness and even death upon the plantation. When hauled to where the cattle and hogs can have free access to them, they sometimes eat enough to sicken and kill them; which effects appear to be produced by the acrid nature of the hull.

My invention will be more clearly understood by some previous reference to the present state of the art of manufacturing oils. Without reference to the peculiar characteristics of cotton seed, the earlier manufacturers proceeded, with them, as with flax seed, to extract the oil without any previous separation of the hull and kernel; consequently so much of the oil was absorbed by the hulls that the percentage yielded was very small, and the oil-cake produced was of a quality so poor as to be scarcely merchantable. These attempts therefore failed and were abandoned. Further attempts to manufacture oil from cotton seed have been made, and much ingenious and elaborate machinery has been invented wherewith to carry them out; but these manufactures and inventions appear to have been attended with many material disadvantages. The machinery is complex and costly, and its use attended with so much expense and labor as to involve the necessity for much capital. My discoveries obviate these difficulties and enable me to simplify both the machinery and process very materially, and are attended with extraordinary success and extraordinary results. I have discovered that with machinery and arrangements already on the plantation I can combine other machinery, by which means I create, so to speak a new manufacture, inasmuch as I convert an article now a comparative waste and nuisance on the plantation into several articles each of which are very valuable.

Oils are made from many substances animal, vegetable, and mineral, possessing widely differing characteristics; and their uses are generally limited to such purposes as the nature of the material indicates. The oil manufactured by my process from cotton seed, is intended for, and peculiarly applicable to the most valuable purposes of which any oil is capable; namely, for the culinary uses of mankind. It is also applicable to the same uses and purposes as most of the other oils.

The seed of cotton is of a spongy nature and, in their condition on the plantation with which we are familiar, they are moist, and the tenacity with which their hull and kernel adhere to one another discourages the idea of practically and economically separating them. However in the attempt to do this very elaborate and expensive machinery has been invented, but its complications and expensiveness appear to have been fatal objections to its use.

My invention consists in drying the cotton-seed, to facilitate the separation of the hull and kernel, passing the dried seed through a mill to crack them, and then allowing them to fall upon a sieve or bolting-cloth, by which the hulls are separated from the kernels and finally subjecting the latter to a heavy pressure to extract the oil therefrom.

I have discovered that by drying the seed, to render the hull brittle, I can pass the seed through a very cheap and simple mill, very similar to a common farm-mill (hereinafter described) and cause this mill conveniently and effectually to separate the hull from the kernel. As the seed pass from the hopper to the mill they are separated from the hulls of the bolls, dirt, &c., by means of a blast (which is very essential) and the clean seed drops into the mill which is so graduated as merely to crack the seed, perhaps into three or four parts, which fall into a coarse sieve by the vibratory motion of which the kernels are caused to fall into a box, and the hulls to pass out at one end of the sieve into a suitable receptacle. The kernels may now be run through another mill and ground quite finely; the finely ground material falls into a box, or into the bags which are finally to receive it. The bags are then placed between the "hair squeezers" and they are placed in their proper department in the press. When some eight bags are thus placed they are subjected to a heavy pressure, and the oil as it runs out falls into a reservoir, which may be a barrel or hogshead, and need not be larger than will hold the pressing of one day, as from this the oil may be passed into another reservoir which is the better for being made large enough to hold the pressing of some fifteen days. A similar reservoir of like size, may be used for the following purpose, that is when the first one is filled to allow it to stand quiet and undisturbed say some fifteen days, in order that the minute particles of kernels, &c., which have escaped through the "squeezers" may settle. The first being filled the oil from the press reservoir is then pumped or taken to the other, and by the time the latter has become full the first has been bottled or barreled off and again becomes the receiver, and by the time it is filled the second one is drawn off, and again becomes the receiver. It is of course to be understood that the sediment is removed from the bottom of the receiver each time its contents are drawn off.

I may properly observe here, that on the plantations we have a press arranged for pressing cotton into bales. By taking away the box, &c., necessary for the reception of the lint-cotton, we can apply that portion of the oil press into which the material from which the oil is to be expressed is placed, under the plantation press and while that press is there make it answer; but when a press is to be supplied I prefer an anti-friction lever press.

We have now the cold-pressed and most highly prized oil which is made; but if it is an object to extract an increased quantity of oil from the seed, instead of the material going directly to the press after the fine grinding which I have described, we may introduce the "rings and stirrers", with the steam heating-table, into which they are inserted, and letting steam into this table the material is put into those rings, and when the "tender" feels that the oil is sufficiently started he draws the rings toward him and the material falls into a bag on each side prepared to catch it, which bags are deposited in the press, as before described, and when the proper number are in place the pressure is applied, when the oil runs out, as before, in an increased quantity, but, it seems of diminished value.

The operation of the mill shown in the accompanying drawing is as follows: As the seed fall from the hopper (G) into the mill they are exposed to the blast of the fan (E), which cleanses them from any impurities such as dirt, hulls of bolls, &c. The clean seed after being cracked by the mill fall upon the sieve (I) which effectually separates the hulls from the kernels; the latter of which fall through the sieve while the former pass off into a suitable receptacle at the end of the sieve. The hulls can then be used as a manure while the seed are ready for the second grinding herein described.

The oil-cake taken from the press and broken up or crushed makes a fine feed for mules, horses, cattle, and hogs, as they learn to love it in a few days, and from the quantity of feed it yields per day, and the quantity of feed used per day on the plantation, it appears that my oil-cake will constitute about one half the feed now used for the usual farm stock above named, and mixed and fed half and half to them will, hence, render the planting of about one half of the present corn crop unnecessary, which has heretofore been requisite. This oil-cake is unusually clean and perfect.

It has been said that to make oil of cotton-seed after the kernel is separated from the hull you proceed just as is done to make linseed oil. It may be proper here to describe the mode of manufacturing oil from flaxseed in order to show how much more simple my process is. The machinery required for this purpose is very heavy, complex, and expensive. The seed, without being hulled are run through a mill to crush them; the meal or crushed material is then put under the operation of huge granite stones, running at considerable speed over iron or granite beds and by the force of great power these stones are caused to revolve over the material to what they call "temper" it. This tempered stuff is then deposited in what are called "rings and stirrers" in a table heated by steam, and from these the material is poured into bags which are deposited in their places in the press, the pressure is applied and the oil runs off, &c. It will be observed that I dispense with a great deal of the machinery and power used to make linseed oil, as I exclude the use of the huge stones which are driven around on an iron or granite bed, and which require so much power to drive them.

To have the seed dry to enable me to use the simple machine I employ as a separator, is positively essential, and the most convenient, preferable and always reliable means of making them so is to be found in my drying closet, a patent for which has just been ordered to issue, care being taken that the perforations in the sides and bottom of the drawers, in which the seed are deposited, are not large enough to permit the seed to fall through them. The seed placed on these drawers may remain until the hull becomes brittle, thence they are run through my separator. To be exposed to a temperature of from 120 to 130 degrees Fahrenheit, in this closet will soon prepare them for hulling, care being taken to only allow the hull to become crispy. It is also preferable to use them as soon after drying as convenient; for, if piled up for any considerable time they might absorb moisture again.

The hulls forming, as before observed, about one half of the whole weight of the seed, constitute a superior manure. The oil of the kernel, when the seed are applied as a manure, renders them rather a repellant than an absorbent of moisture, but the hull, separated from the kernel, becomes an absorbent of moisture which they feed to the plants. The objection of the planters to send their seed off for sale, because they require or use them for a manure I obviate in my process, as by manufacturing them on the plantation, and furnishing him in my oil-cake with half his plantation feed, I render unnecessary his planting of more than half the land in corn he formerly had done. He consequently will not have a use for manure for over half the corn land he had before wanted. This land, which has heretofore necessarily been planted in corn, and the hands, mules, implements, &c., required to attend to it, are of large specific value and represents an investment of so much capital, and its proportion of family and plantation expenses is considerable. The amount of that investment will largely exceed the cost of the machinery and arrangements I shall require beyond that already on the plantation, and which can be conveniently appropriated in the combination. Hence, by my process, besides the value of the oil annually sold, I annually save him this investment.

It may be well to remark that various modifications of my machinery might be resorted to, to accomplish my purpose, and which would readily suggest themselves to the intelligent oil manufacturer after he had read my specification.

It is obvious that the oil and oil-cake made directly from the fresh seed on the plantation must be much superior both in purity and quality to that manufactured from seed which have been transported long distances to the factories where expensive and elaborate machines are used as the seeds are liable to become rotted or otherwise damaged in transportation. It therefore follows that oil made by my process will at once commend itself to the confidence of the consumer.

The important advantages and profitable results produced by my process are that with it the cotton planter makes an article now a comparative waste and nuisance on his plantation, one of great productive wealth to himself, and of great value to the commerce of the country. By it he makes an improved oil, also what is equivalent to a largely increased corn crop, and also a manure of great superiority; all of which is accomplished by means of cheap and much simplified machinery, and with less capital than he has heretofore employed in producing his cotton crop.

What I claim and desire to secure by Letters Patent is my

Improvement in the treatment of cotton seed, by which oil, oil-cake, and manure are obtained therefrom in the manner and for the purposes, substantially as described.

In testimony whereof I have hereunto subscribed my name.

GEO. G. HENRY.

Witnesses:
  WM. D. BALDWIN,
  JNO. H. JOHNSON.